United States Patent [19]

Kohn

[11] Patent Number: 5,241,636
[45] Date of Patent: Aug. 31, 1993

[54] METHOD FOR PARALLEL INSTRUCTION EXECUTION IN A COMPUTER

[75] Inventor: Leslie D. Kohn, San Jose, Calif.

[73] Assignee: Intel Corporation, Santa Clara, Calif.

[21] Appl. No.: 479,946

[22] Filed: Feb. 14, 1990

[51] Int. Cl.[5] ............................ G06F 9/22; G06F 9/30
[52] U.S. Cl. .................................. 395/375; 364/231.8;
  364/259.8; 364/259.9; 364/262.4; 364/DIG. 1
[58] Field of Search ............................... 395/375, 800

[56] References Cited

U.S. PATENT DOCUMENTS

| | | | |
|---|---|---|---|
| 4,631,663 | 12/1986 | Chilinski et al. | 395/375 |
| 4,891,787 | 1/1990 | Gifford | 395/800 |
| 5,067,069 | 11/1991 | Fite et al. | 395/375 |

Primary Examiner—Parshotam S. Lall
Assistant Examiner—Ayni Mohamed
Attorney, Agent, or Firm—Blakely, Sokoloff, Taylor & Zafman

[57] ABSTRACT

A method for parallel instruction execution in a computer is described. If the computer is executing in the single-instruction mode and the computer encounters a first type of instruction with a dual-instruction mode bit having a first value, then one more single instruction is executed before dual-instruction mode instruction execution begins. The first type of instruction is an instruction having a dual-instruction mode bit. The dual-instruction mode instruction execution occurs in parallel. If the computer is executing in the dual-instruction mode and the computer encounters the first type of instruction with the dual-instruction mode bit having a second value, wherein the second value is different from the first value, then one more dual instruction is executed before single-instruction mode instruction execution resumes.

3 Claims, 4 Drawing Sheets

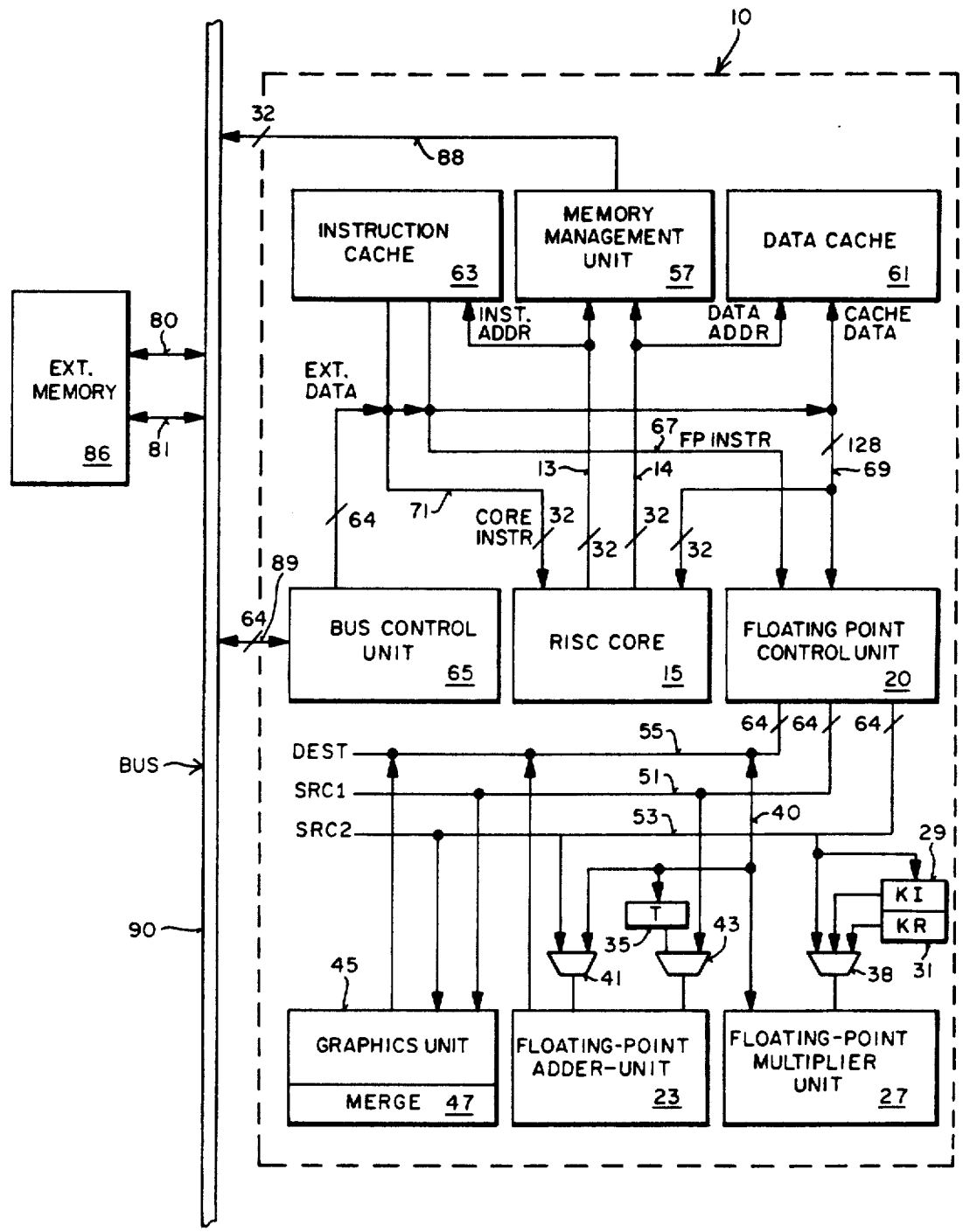

FIG_2
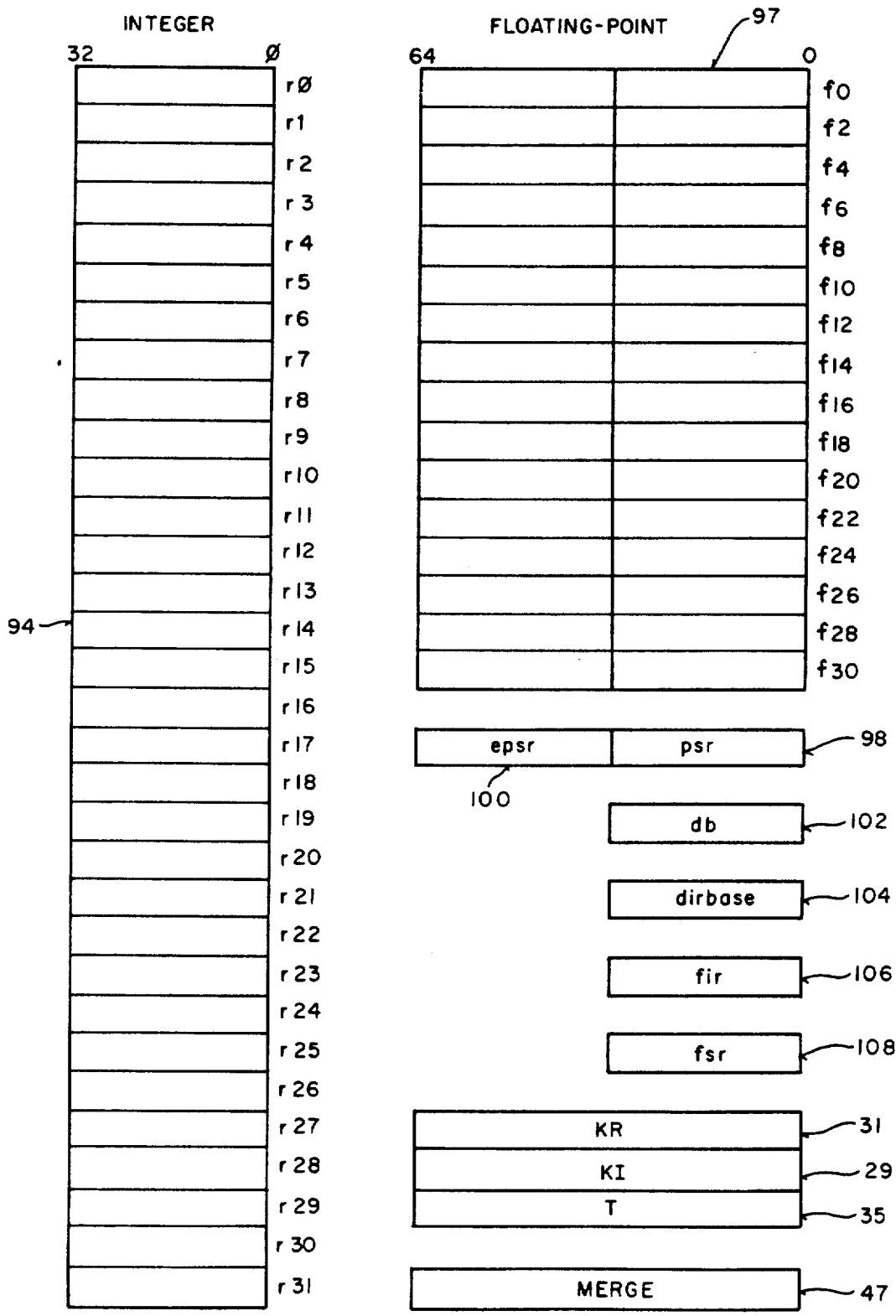

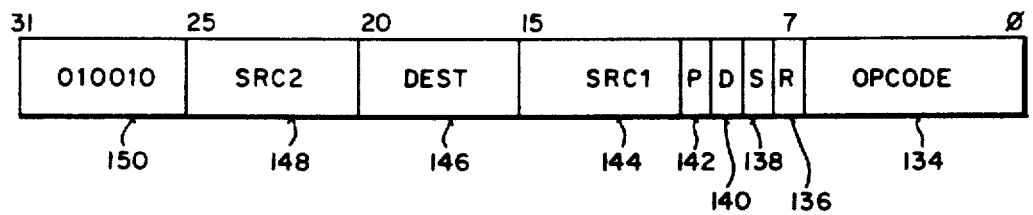
FIG_3
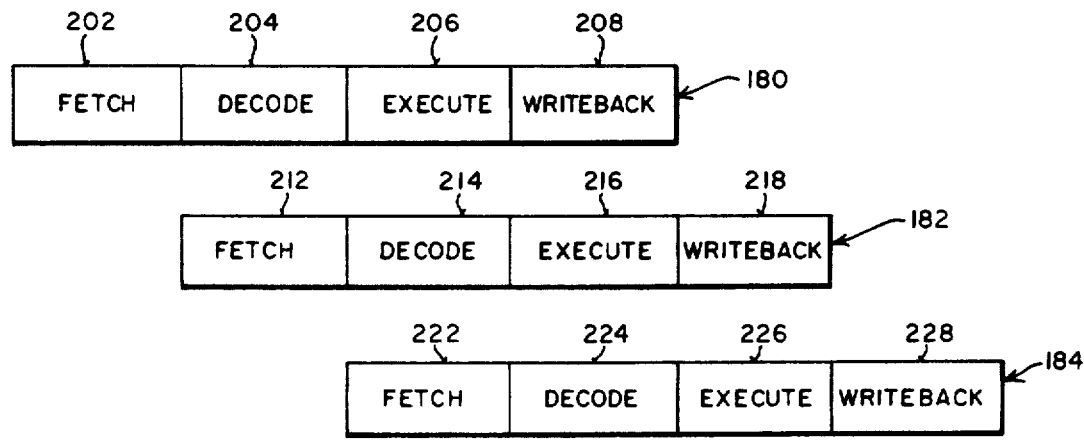
FIG_4
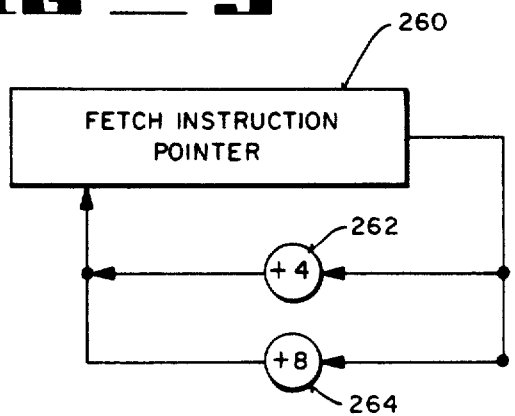
FIG_5

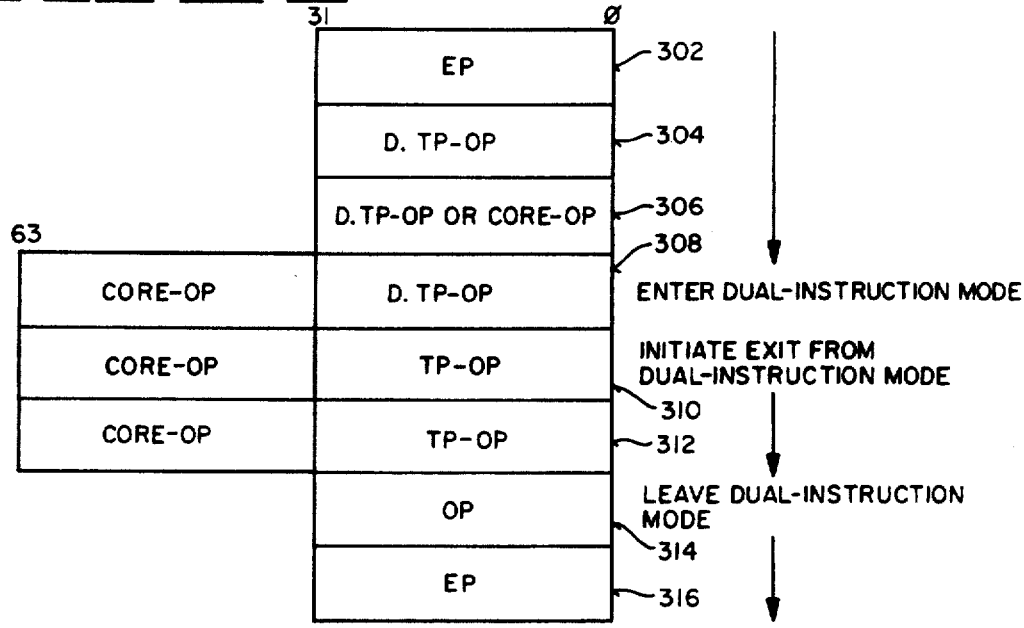
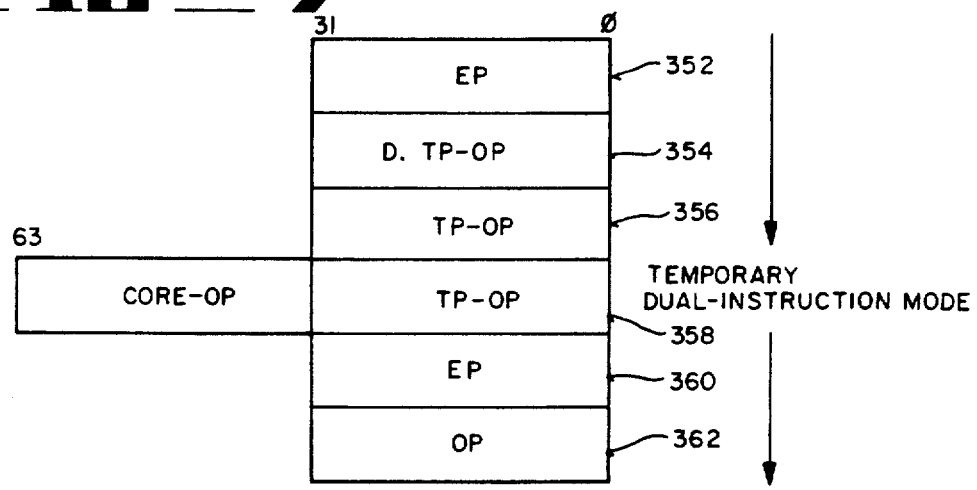
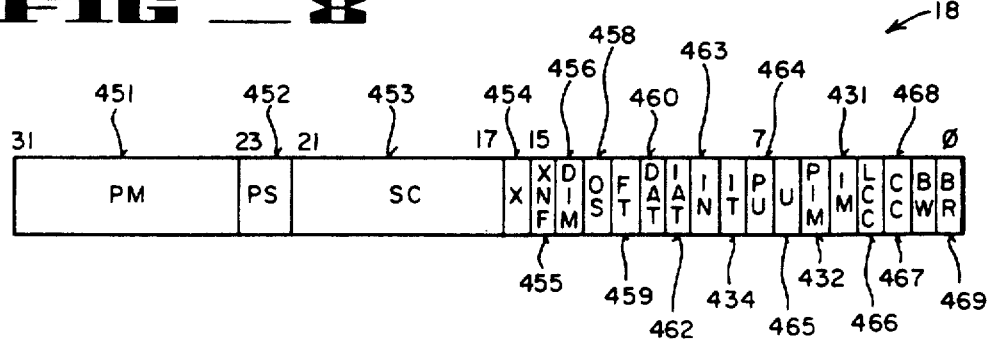

METHOD FOR PARALLEL INSTRUCTION EXECUTION IN A COMPUTER

FIELD OF THE INVENTION

The present invention pertains to the field of computer architecture with respect to the handling of integer and floating-point operations. More particularly, this invention relates to a method for executing integer instructions and floating-point instructions in parallel in a computer.

BACKGROUND OF THE INVENTION

One prior computer architecture technique to increase computer performance is the use of parallelism. One prior type of parallelism is parallel instruction execution. Parallel instruction execution means that two or more instructions are executed at substantially the same time in a computer system.

In one prior computer system, instructions are at all times executed in parallel. In this prior computer system, parallelism is the only mode of operation. One disadvantage of this full time parallel approach is that it wastes space in memory.

In another prior computer system however, the computer system switches between a single instruction sequential mode and a dual instruction parallel execution mode. In this prior computer system, there is no delay in switching between the single instruction mode and the dual instruction parallel mode. One disadvantage of this no-delay system is that relatively complicated decoding logic is required in order to determine without delay that the dual-instruction parallel mode is to be entered or exited from. This prior system requires parallel decoding logic and relatively long critical circuit delays. The result is a relative increase in hardware complexity.

SUMMARY AND OBJECTS OF THE INVENTION

In view of limitations of known systems and methods, one of the objectives of the present invention is to minimize hardware complexity in a computer system that provides parallel instruction execution.

Another objective of the present invention is to provide a method for parallel instruction execution on a computer that minimizes the use of memory space.

Another objective of the present invention is to provide a method for parallel instruction execution on a computer that incorporates a delay between switching from a single instruction mode to a dual instruction mode.

These and other objects of the invention are provided for by a method and apparatus for parallel instruction execution in a computer. If the computer is executing in the single-instruction mode and the computer encounters a first type of instruction with a dual-instruction mode bit having a first value, then one more single instruction is executed before dual-instruction mode instruction execution begins. The first type of instruction is an instruction having a dual-instruction mode bit. The dual-instruction mode instruction execution occurs in parallel. If the computer is executing in the dual-instruction mode and the computer encounters the first type of instruction with the dual-instruction mode bit having a second value, wherein the second value is different from the first value, then one more dual instruction is executed before single-instruction mode instruction execution resumes.

Other objects, features, and advantages of the present invention will be apparent from the accompanying drawings and from the detailed description that follows below.

BRIEF DESCRIPTION OF THE DRAWINGS

The present invention is illustrated by way of example and not limitation in the figures of the accompanying drawings in which like references indicated similar elements and in which:

FIG. 1 is a block diagram of the architecture of a computer processor;

FIG. 2 illustrates certain registers of the processor;

FIG. 3 illustrates floating-point instruction encoding;

FIG. 4 illustrates certain pipelined steps;

FIG. 5 illustrates a fetch instruction pointer;

FIG. 6 illustrates an extended sequence of dual instructions;

FIG. 7 illustrates a temporary dual-instruction mode; and

FIG. 8 illustrates a processor status register of the processor.

DETAILED DESCRIPTION

FIG. 1 sets forth a block diagram of the architecture of a computer processor 10 that implements a preferred embodiment of the present invention. Microprocessor functions as a 32/64-bit IEEE-compatible floating-point processor, a 32-bit reduced instruction set computer ("RISC") integer processor, and a 64-bit three dimensional graphics processor.

Microprocessor 10 employs a four-stage pipeline. The four stages of the pipeline comprise a Fetch Instruction Stage, a Decode Instruction Stage, an Execute Instruction Stage, and a Write-Back Stage.

For floating-point instructions, the Execution stage is subdivided into more pipelined stages, each consuming one clock. Moreover, there are four different types of floating-point pipelines: one for floating point multiplier unit 27, one for floating-point adder unit 23, one for graphics unit 45 and one for pipelined floating-point loads. The add or execution pipeline has three stages. Graphics unit 45 has a one stage pipeline. The pipelined load execution pipeline has three stages. A multiplier pipeline employing single-precision input operands in the pipeline has three stages. A multiplier pipeline employing double precision input operands in the pipeline has two stages.

A single precision operand is a 32-bit binary floating-point number with a sign bit along with exponent bits and fraction bits. A double precision operand is a 64-bit binary floating-point number with a sign bit along with exponent bits and fraction bits. The floating-point data type, floating-point instructions, and exception handling all support IEEE standard 759 (1985) for Binary Floating-Point Arithmetic.

In FIG. 1, RISC core unit 15 is the administrative center for microprocessor 10. Core unit 15 contains integer register file 94 of FIG. 2. Core unit 15 fetches both integer and floating-point instructions. Core unit 15 is pipelined, and decodes and executes load, store, integer, bit, and control transfer operations.

Data cache 61 is a two-way set associative memory of six kilobytes, with 32-byte blocks. Data cache 61 provides data caching in byte alignment for read and write operations. Data cache 61 is a write-back cache. Data cache 61 employs a one clock read, and a two-clock pipelined write.

Instruction cache 63 is a two-way set associative memory of four kilobytes with 32-byte blocks. Instruction cache 63 supplies a 32-bit integer and a 32-bit floating-point instruction in each clock through a 64-bit wide instruction bus comprised of lines 71 and 67.

Bus control unit 65 provides an interface to external bus 90. External bus 90 is coupled to microprocessor 10 via lines 88 and 89. Lines 89 couple bus control unit 65 to bus 90. Bus 90 is coupled to external memory via address lines 80 and data lines 81. Bus control unit 65 gets bus cycle requests and specifications from RISC core unit 15. Bus control unit 65 perform data and instruction cache access and also handles cache miss cases, including freeze control and cache line replacement. Bus control unit 65 also performs translation lookaside buffer ("TLB") translation. Bus control unit 65 has a pipelined structure that allows up to three outstanding bus cycles.

Core instruction bus 71 couples RISC core unit 15 with instruction cache 63. Floating-point instruction bus 67 couples floating-point control unit 20 with instruction cache 63. Data bus 69 is coupled to RISC core unit 15, floating-point control unit 20, and data cache 61.

Memory management unit 57 is coupled to (1) RISC core unit 15 via lines 13 and 14, and (2) bus 90 via lines 88. Memory management unit 57 performs the translation of the address from the linear logical address space (i.e., the virtual address space) to the linear physical addresses for both data and instruction access.

Floating-point control unit 20 issues floating-point instructions and operands to floating-point adder unit 23 and floating-point multiplier unit 27. Floating-point control unit 20 handles all source and result errors due to floating-point operations.

Floating point adder unit 23 performs floating-point addition, floating-point subtraction, comparisons, and conversions. Floating-point multiplier unit 27 performs floating-point and integer multiply and floating-point reciprocal operations. Both the floating-point adder 23 and the floating-point multiplier 27 support 64-bit and 32-bit values in IEEE standard 754 format. Each of these units uses pipelining to deliver up to one result per clock.

Graphics unit 45 of FIG. 1 has 64-bit integer logic that supports three-dimensional graphics drawing algorithms. Graphics unit 45 contains special purpose merge register 47. Buses Src1 51, Src2 53, and Dest 55 are each coupled to graphics unit 45, floating-point adder unit 23, floating-point multiplier unit 27, and floating-point control unit 20. Registers KI 29, KR 31, and T 35 are special-purpose registers used by certain instructions.

FIG. 2 illustrates registers 92 of microprocessor 10. Registers 92 include integer register file 94, floating-point register file 97, and control registers psr 98, epsr 100, db 102, dirbase 104, fir 106, and fsr 108. Registers 92 also include special purpose registers KR 31, KI 29, T 35, and MERGE register 47.

The control register psr 98, epsr 100, db 102, dirbase 104, fir 106, and fsr 108 are accessible only by load and store control register instructions. The integer registers 94 and floating-point registers 97 are accessed by arithmetic operations and load and store instructions.

Integer register file 94 has 32 integer registers, each 32-bits wide, referred to as r0 through r31. Floating-point file register 97 has 32 floating-point registers, each 32-bits wide, referred to as f0 through f31 which are used for floating-point computations.

FIG. 3 illustrates the encoding for floating-point instruction 130. The tenth bit from the right (i.e., bit 9) is the dual instruction mode bit D140. Thus, when the D bit 140 is set a logical one, that indicates that parallel execution will begin on the second instruction following the present instruction if microprocessor 10 is currently executing instructions in the single-instruction mode.

When a dual instruction mode bit 140 has a value of logical zero, this indicates that the second operation following the present operation will be a single instruction mode instruction if microprocessor 10 is currently executing instructions in the dual-instruction mode.

The setting or clearing of the dual instruction mode bit 140 thus produces a delayed effect—the present instruction is thus not affected by the setting of dual instruction mode bit 140. This delayed effect lets the hardware know in advance that the dual-instruction mode is to be entered or exited.

Floating-point instruction 130 also includes pipelining bit P 142, source precision bit S 138, result precision bit R 136, opcode bits 134, source bits SRC1 144 and SRC2 148, destination bits DEST 146, and bits 150.

FIG. 4 illustrates, for a four stage pipeline, overlapping execution of a first instruction 180, a second instruction 182, and a third instruction 184. Executing the first instruction 180 requires, in subsequent clock periods, a fetch stage 202, a decode stage 204, an execute stage 206, and a writeback stage 208. Similarly, executing the second instruction 182 requires a fetch stage 212, a decode stage 214, an execute stage 216, and a writeback stage 218. Execution of each of these stages 212, 214, 216, 218 of the second instruction 182 occurs one clock period later than the stages 202, 204, 206, 208 of the first instruction. Therefore, for example, execution is overlapped between the decode stage 204 for the first instruction 180 and the fetch stage 212 for the second instruction 182. Executing stages 222, 224, 226, 228 for the third instruction 184 occurs one clock period later than the second instruction 182, and two clock periods later than the first instruction 180.

At each of the fetch stages 202, 212, and 222 of FIG. 4, microprocessor 10 can fetch either one or two instructions at once from external memory 86 or from instruction cache 63. One instruction is fetched when microprocessor 10 is in the single instruction mode. Two instructions are fetched when microprocessor 10 is in the dual-instruction mode.

D Bit 140 of floating-point instruction 130 of FIG. 3 determines whether microprocessor 10 is in the single instruction mode or the dual instruction mode. If D bit 140 has a value of logical one and microprocessor 10 is presently executing in the single-instruction mode, that means that the second instruction following the present instruction is a dual-instruction mode instruction. If the D bit 140 is a logical zero and microprocessor is presently executing in the dual-instruction mode, this means that the second instruction following the present instruction is a single-instruction mode instruction.

In FIG. 4, at fetch stage 202, floating-point instruction 130 would be fetched from either instruction cache 63 or external memory 86. At stage 204, floating-point instruction 130 is decoded. This means that at decode stage 204 D bit 140 is also decoded. Microprocessor 10 does not see D bit 140 until an instruction decode stage is entered.

D bit 140 is needed in order to determine whether two instructions or one instruction need to be fetched for a subsequent clock cycle. D bit 140 also determines the alignment for a subsequent instruction fetch.

As can be seen in FIG. 4, however, decode stage 204 occurs at the same point of time as fetch stage 212. Therefore, the information obtained from decoding D bit 140 at decode stage 204 comes too late to be useful for fetch stage 212. In other words, D bit 140 is being decoded at stage 204 at the same time fetch 212 is occurring.

Nevertheless, the D bit 140 information from decode stage 204 can be used for fetch stage 222. The decoding of D bit 140 at decode stage 204 determines whether one or two instructions will be fetched at fetch stage 222. At stage 222, a single instruction will be fetched if D bit 140 decoded at stage 204 is zero and at stage 204 microprocessor 10 is executing in the dual-instruction mode. On the other hand, if D bit 140 decoded at decode 204 is a logical one and at stage 204 microprocessor 10 is executing in the single-instruction mode, then two instructions will be fetched at fetch stage 222. That is why there is a two instruction delay in entering or exiting the dual-instruction mode. The decoding of D bit 140 at decode stage 204 will also be used at fetch stage 222 for alignment purposes. Alignment depends upon whether microprocessor 10 is the dual instruction mode or the single instruction mode.

FIG. 5 illustrates fetch instruction pointer 260, which contains the address of the instruction to be fetched at one of the fetch stages 202, 212 or 222 of FIG. 4. The incrementing of fetch instruction pointer 260 by 4 bytes or 8 bytes occurs at the fetch stage and is governed by the rules set forth above in the discussion of FIG. 4 with respect to the decoding of D bit 140. Fetch instruction pointer 260 is incremented by four bytes for the single-instruction mode. This is shown by block 262 in FIG. 5. Fetch instruction pointer 260 is incremented by 8 bytes for the dual-instruction mode. This is shown by block 264 of FIG. 5.

The four bytes of block 262 of FIG. 5 is the incremental amount given that a single instruction is 32-bits long. The 8 bytes of block 264 are required given that when microprocessor 10 is executing in the dual-instruction mode, the instruction sequence consists of 64-bit aligned instructions with a floating-point instruction in the lower 32-bits and a core instruction in the upper 32-bits.

FIG. 6 illustrates an instruction execution sequence that includes an extended sequence of dual-instructions. Microprocessor 10 can execute a floating-point instruction and a core (i.e., integer) instruction in parallel. This means that a floating-point instruction and a core instruction can be executed substantially simultaneously. The mode in which parallel execution of floating-point instructions and core instructions occurs is called the dual-instruction mode. When executing in the dual-instruction mode, the instruction sequence consists of 64-bit aligned instructions. For each 64-bit aligned instruction, a floating-point instruction resides in the lower 32 bits and a core instruction resides in the upper 32 bits.

For microprocessor 10, one way to specify the dual-instruction mode is to include in the mnemonic of a floating-point instruction a "d." prefix. In other words, the prefix d. would appear before the name of the instruction. Alternatively, the dual-instruction mode is specified by using the assembler directives ".dual . . . enddual."

Both the "d." prefix and the dual/enddual assembler directives cause D bit 140 of the particular floating-point instruction to be set to a logical one.

If microprocessor 10 is executing in a single-instruction mode and encounters a floating-point instruction with D bit 140 set to a logical one, then one more 32-bit instruction is executed before the dual-instruction mode execution begins. If, however, microprocessor 10 is executing in the dual-instruction mode and a floating-point instruction is encountered with a D bit having a value of logical zero, then one pair of instructions is executed before resuming the single-instruction mode. The one pair of instructions would comprise a single 64-bit aligned instruction comprised of a floating-point instruction in the lower 32-bits and a core instruction in the upper 32-bits.

In the sequence of FIG. 6, at step 302 an instruction is fetched, decoded, and executed by microprocessor 10. The instruction corresponds to an operation. In FIG. 6, the instruction is 32-bits wide. Bit 0 is the least significant bit and bit 31 is the most significant bit. At step 302, the instruction could be either a floating-point instruction or an integer or core instruction.

At step 304, a floating-point instruction is read, decoded, and executed. At step 304, the floating-point instruction has a d. prefix. The d. prefix means that the D-bit 140 of that particular instruction is set to a logical one. Thus, when microprocessor decodes the instruction at 304, microprocessor 10 will find that the D-bit 140 is set to a logical one. Because at step 304 microprocessor 10 is executing in the single-instruction mode and D-bit 140 has been set to a logical one, microprocessor 10 will execute one more 32-bit instruction before entering the dual-instruction mode. That 32-bit instruction is executed at step 306 before entering the dual-instruction mode and the instruction executed at step 306 can either be a floating-point instruction or a core or integer instruction, as long as it is 32-bits wide.

It is to be appreciated that when a d. prefix appears before a floating-point instruction in the source code, the assembler then sets the D position bit 140 to a logical one in the object code. In FIG. 6, when the microprocessor fetches and decodes an instruction, it is fetching and decoding the object code for that instruction.

At step 308, a floating-point instruction is executed in parallel with a core instruction. As shown in FIG. 6, the floating-point instruction occupies the lower 32 bits and the core instruction resides in the upper 32 bits of a single 64-bit aligned instruction. In FIG. 6, the floating-point portion of the 64-bit aligned instruction at step 308 has the d. prefix.

At step 310, microprocessor 10 is still in the dual-instruction mode. At step 310, a 64-bit aligned instruction with a floating-point instruction in the lower 32 bits and a core instruction in the upper 32 bits is executed. The floating-point instruction in the lower 32 bits does not include the d. prefix. Therefore, the D bit 140 associated with that floating-point instruction has a value of a logical 0. Given that the D bit 140 of the floating-point instruction in the lower 32 bits has a value of logical 0 and that microprocessor 10 is in the dual-instruction mode, one more 64-bit instruction comprising a floating-point instruction and a core instruction will be executed before the single instruction mode is resumed.

At step 312, another 64-bit aligned instruction with a floating-point instruction and a core instruction is executed. The 64-bit instruction at step 312 is the instruction that needs to be executed before the dual instruction mode is left.

At step 314, microprocessor 10 returns to the single instruction mode. At step 314, a single instruction comprised of 32-bits is fetched, decoded, and executed. Again, step 314 is a single instruction mode step given. Step 310 initiated an exit from the dual-instruction mode.

At step 316, the single instruction mode continues, with another 32-bit instruction being executed. The instructions at steps 314 and 316 each can be a 32-bit floating-point instruction or a 32-bit integer instruction.

FIG. 7 illustrates an instruction execution sequence that includes dual-instruction mode execution for a single instruction pair. The dual instruction mode execution of a single instruction pair is also referred to a temporary dual instruction mode execution. At step 352 of FIG. 7, a single 32-bit instruction is executed in the single instruction mode. The instruction executed at step 352 can be either a floating-point instruction or a core (i.e., integer) instruction.

At step 354, a single 32-bit floating-point instruction with a d. prefix is executed. The d. prefix means that the D-bit 140 of that floating-point instruction has a value of logical one. Given that at step 354 microprocessor 10 is in the single instruction mode and that D-bit 140 is set to a logical one, that means that the instruction executed two instructions hence will be a dual-instruction mode 64-bit instruction.

At step 356, a single floating-point instruction is executed in the single instruction mode. At step 356, there is no d. prefix, so therefore the D-bit has a value of logical 0.

At step 358, the dual-instruction mode is entered. At step 358, a 64-bit aligned instruction with a 32-bit floating-point instruction in the lower bits and a 32-bit core instruction in the upper bits is executed. The 64-bit instruction executed at step 358 is executed in the dual-instruction mode.

At step 360, the single instruction mode is entered. At step 360, a 32-bit instruction is executed. The instruction can either be a floating-point instruction or a integer instruction. The dual-instruction mode was exited resulting in step 360 being in the single instruction mode given that the D bit of the floating-point instruction two instructions earlier—i.e., at step 356—had a value of logical 0.

At step 362, another instruction is executed in the single instruction mode. The instruction executed at step 362 can either be a floating-point instruction or an integer instruction. Neither of the instructions at step 360 or 362 have the d. instruction prefix.

In a preferred embodiment, the dual-instruction mode has certain characteristics. When a 64-bit wide dual-instruction pair sequentially follows a delayed branch instruction in the dual-instruction mode, then both of the 32-bit instructions of the 64-bit dual-instruction pair are executed.

The recommended floating-point no operation ("nop") for the dual instruction mode is the "shift right double" instruction "shrd r0, r0, r0." This is a core instruction. Even though this is a core instruction, when the "shrd r0, r0, r0" instruction appears in the lower order half of a dual instruction, bit 9 of the opcode for that instruction is interpreted as the dual-instruction control bit D bit 140. In assembly language, this instruction is specified as the floating-point no-operation instruction fnop or d.fnop that "floating-point no operation" instruction "fnop" or "d.fnop." Traps are not reported on a fnop instruction. Because fnop is a core instruction, d.fnop cannot be used to initiate entry into the dual-instruction mode.

The dual-instruction mode has other restrictions. The result of placing a core instruction in the lower order 32-bits of a 64-bit wide dual-instruction mode instruction or a floating-point instruction in the high order 32-bits of a 64-bit dual-instruction is not defined. The exception to this, however, is the core instruction shrd r0, r0, r0, which is interpreted as the fnop instruction.

When the floating-point operation is scalar and the core operation a floating-point store operation ("fst") or a pixel store operation ("pst"), the store operation should not reference the result register of the floating-point operation. When the core operation is pst, the floating-point instruction cannot be a 32-bit Z-buffer check instruction ("fzchkl"), a 16-bit Z-buffer check instruction ("fzchks"), a pipelined 32-bit Z-buffer check instruction ("pfzchkl"), or a pipelined 16-bit Z-buffer check instruction ("pfzchks").

When the core instruction of a dual-instruction mode pair is a control transfer operation and the previous instruction had the D-bit set, then the floating-point instruction must also have the D-bit set to a logical one. In other words, an exit from the dual-instruction mode cannot be initiated (i.e., first instruction pair without D-bit set) when the core instruction is a control transfer instruction.

When the core operation is a "load from control register" instruction ("ld.c") or a "store to control register" instruction ("st.c"), the floating-point operation must be the d.fnop operation.

When the floating-point operation is a "transfer floating-point to integer register" instruction ("fxfr"), the core instruction cannot be a load instruction ("ld"), a "load from control register" instruction ("ld.c"), a store instruction ("st"), a "store to control register" instruction ("st.c"), a subroutine call instruction ("call"), a "transfer integer to floating-point register" instruction ("ixfr"), or any instruction that updates an integer register, including autoincrement indexing. Furthermore, the core instruction cannot be a "floating-point load" ("fld") instruction, an fst instruction, a pst instruction, or a "pipelined floating-point load" ("pfld") instruction that uses as isrc1 or isrc2 the same register as the idest of the fxfr instruction.

Certain procedures apply with respect to the handling of traps in relation to the dual instruction mode. Traps are caused by external interrupts or by exceptional conditions also referred to as ("exceptions") detected in programs. Traps cause the interruption of normal program flow so that a special program known as a trap handler can be executed. Examples of exceptions include overflows, underflows, and inexact results. Types of traps include an instruction fault, a floating-point fault, an instruction access fault, a data access fault, an interrupt, and a reset. If a trap occurs, instruction execution is stopped and a trap handler is executed.

FIG. 8 illustrates processor status register psr 98, which contains miscellaneous state information for the current process. Processor status register 98 includes delayed switch bit DS 458 and Dual Instruction Mode bit DIM 456.

When a trap occurs, microprocessor 10 sets dual-instruction mode DIM bit 456 to a logical one if microprocessor 10 is executing in the dual-instruction mode. Microprocessor 10 clears dual-instruction mode bit 456 to a logical 0 if microprocessor 10 is executing in the single instruction mode. If the dual-instruction mode 456 is set to a logical one, then microprocessor 10 resumes execution in the dual-instruction mode after returning from a trap handler.

The delayed switch DS bit 458 is set to a logical one if a trap occurs during the instruction before the dual-instruction mode is entered or exited. If the delayed switch 458 bit is set to a logical one and the dual instruction mode bit 456 is cleared to a logical 0, then microprocessor 10 switches to the dual-instruction mode one instruction after returning from the trap handler. If the delayed switch bit 458 and the dual-instruction mode bit 456 are both set to a logical one, then microprocessor 10 switches to the single instruction mode one instruction after returning from the trap handler.

The above can be restated as follows. Upon invocation of the trap handler, if microprocessor 10 was in the dual instruction mode, then microprocessor sets dual-instruction mode bit 456 to a logical one. If, however, microprocessor 10 was in the single instruction mode, then microprocessor clears dual-instruction mode bit 456 to a logical 0.

Upon invocation of the trap handler, if microprocessor 10 was in the single-instruction mode and the next instruction will be executed in the dual-instruction mode, or if microprocessor 10 was in the dual-instruction mode and the next instruction will be executed in the single instruction mode, then delayed switch 458 is set to a logical one. Otherwise, delayed switch bit 458 is cleared to a logical 0.

Upon invocation of the trap handler, an address is placed in the fault instruction register fir 106 to help locate the trapped instruction. In the single instruction mode, the address in fir 106 is the address of the trapped instruction itself. In the dual-instruction mode, the address in fir is that of the floating-point half of the dual instruction. If an instruction fault or a data access fault occured, the associated core instruction is the high order half of the dual-instruction (i.e., fir=4). In the dual instruction mode, when a data access fault occurs in the absence of other trap conditions, the floating-point half of the dual-instruction will already have been executed.

The processor begins executing the trap handler by transferring execution to virtual address 0xFFFFFF00. The trap handler begins execution in the single instruction mode. The trap handler must examine the trap-type bits in processor status register 98 and extended processor register 100 to determine the cause or causes or the trap.

In determining where to resume execution upon leaving the trap handler, the instruction address fir-4 is examined.

Processor status register 98 also includes pixel mask bits PM 451, pixel size bit PS 452, shift count bit SC 453, reserve bit 454, kill next floating-point instruction bit KNF 455, floating-point trap bit FT 459, data access trap bit DAT 460, instruction access trap bit IAT 462, interrupt bit IN 463, previous user mode bit PU 464, user mode bit U 465, interrupt mode bit IM 431, previous interrupt mode bit PIM 432, loop condition code bit LCC 466, condition code bit CC 467, break write bit BW 468, and break read bit BR 469.

A branch indirect unconditionally ("bri") instruction must not be executed in dual-instruction mode if any trap bits are set.

In the dual instruction mode, when the core operation is a branch on condition code 467 instruction ("bc.t") or a branch on condition code 467 taken instruction ("bnc.t"), the floating-point operation cannot be a pipelined floating-point equal compare instruction ("pfeq"), a pipelined floating-point less-than or equal compare instruction ("pfle"), or a pipelined floating-point greater-than compare instruction ("pfgt"). The floating-point operation in the sequentially following instruction pair cannot be a pfeq, a pfle, or a pfgt instruction, either.

A transition to or from the dual-instruction mode cannot be initiated on the instruction following a branch indirect unconditionally instruction bri.

An ixfr, fld, or pfld instruction cannot update the same register as the companion floating-point instruction unless the destination is f0 or f1. No overlap of register destinations is permitted.

In a locked sequence, a transition to or from dual-instruction mode is not permitted.

Appendix 1 sets forth the source code for microprocessor 10 for summing the single-precision elements of an arbitrarily long vector.

The procedure of Appendix 1 uses the dual-instruction mode to overlap loading, decision making, and branching with the basic pipelined floating-point add instruction pfadd.ss. To make obvious the pairing of core and floating-point instructions in the dual-instruction mode, the listing in Appendix 1 shows the core instruction of a dual mode pair indented with respect to the corresponding floating-point instruction.

In the source code of Appendix 1, elements are loaded two at a time into alternating pairs of registers: one time at loop1 into registers f20 and f21, the next time at loop2 into registers f22 and f23. Performance would be slightly degraded if the destination of a floating-point load instruction fld.d were referenced as a source operand in the next two instruction. The strategy of alternating registers avoids this situation and maintains maximum performance. Some extra logic is needed at sumup to account for an odd number of elements.

The source code of Appendix 1 shows how to maintain high throughput of the floating-point unit while simultaneously loading the data from main memory and controlling the logical flow.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

APPENDIX 1

```
// SINGLE-PRECISION VECTOR SUM
//   input:   r16 - vector address
//            r17 - vector size (must be >5)
//   output:  f16 - sum of vector elements
syvsum:
fld.d       r0(r16)   f20            // Load first two elements
mov         -2,       r21            // Loop decrement for bla
                                     // Initiate entry into dual-instruction mode
d.pfadd.ss  f0,       f0,    f0      // Clear adder pipe (1)
adds        -6,       r17,   r17     // Decrement size by 6
                                     // Enter into dual-instruction mode
d.pfadd.ss  f0,       f0,    f0      // Clear adder pipe (2)
bla         r21,      r17,   loop1   // Initialize LCC
d.pfadd.ss  f0,       f0,    f0      // Clear adder pipe (3)
```

APPENDIX 1-continued

```
// SINGLE-PRECISION VECTOR SUM fld.d       8(r16)++,    f22      // Load 3rd and 4th elements
loop1::
    d.pfadd.ss  f20,   f30,  f30      // Add f20 to pipeline
    bla         r21,   r17,  loop2    // If more, go to loop2 after
    d.pfadd.ss  f21,   f31,  f31      // adding f21 to pipeline and
    fld.d       8(r16)++,    f20      // loading next f20:f21
    // If we reach this point, at least one element remains
    // to be loaded. r17 is either −4 or −3.
    // f20, f21, f22, and f23 still contain vector elements.
    // Add f20 and f22 to the pipeline, too.
    d.pfadd.ss  f20,   f30,  f30
    br          sumup                 // Exit loop after adding
    d.pfadd.ss  f21,   f31,  f31      // f21 to the pipeline
    nop
loop2::
    d.pfadd.ss  f22,   f30,  f30      // Add f22 to pipeline
    bla         r21,   r17,  loop1    // If more, go to loop1 after
    d.pfadd.ss  f23,   f31,  f31      // adding f23 to pipeline and
    fld.d       8(r16)++,    f22      // loading next f22:f23
    // If we each this point, at least one element remains
    // to be loaded. r17 is either −4 or −3.
    // f20, f21, f22, and f23 still contain vector elements.
    // Add f20 and f21 to the pipeline, too.
    d.pfadd.22  f20,   f30,  f30
    nop
    d.pfadd.ss  f21,   f31,  f31
    nop
sumup::                               // Initiate exit from dual mode
    pfadd.ss    f22,   f30,  f30      // Still in dual mode
    mov         −4,          r21
    pfadd.ss    f23,   f31,  f31      // Last dual-mode pair
    bte         r21,   r17,  done     // If there is one more
    fld.l       8(r16)++,    f20      // element, load it and
    pfadd.ss    f20,   f30,  f30      // add to pipeline
    // Intermediate results are sitting in the adder pipeline.
    // Let A1:A2:A3 represent the curring pipeline contents
done::
    pfadd.ss    f0,    f0,   f30      // 0:A1:A2       f30=A3
    pfadd.ss    f30,   f31,  f31      // A2+A3:0:A1    f31=A2
    pfadd.ss    f0,    f0,   f30      // 0:A2+A3:0     F30=A1
    pfadd.ss    f0,    f0,   f0       // 0:0:A2+A3
```

APPENDIX 1-continued

```
// SINGLE-PRECISION VECTOR SUM pfadd.ss    f0,    f0,   f31      // 0:0:0         F31=A2+A3
    fadd.ss     f30,   f31,  f16      // f16 = A1+A2+A3
```

What is claimed is:

1. In a pipelined computer having a first processing unit for executing instructions of a first type and a second processing unit for executing instructions of a second type, a method for fetching and executing dual instructions, comprising the steps of:

(a) fetching a first instruction in a first clock period;

(b) in a second clock period, decoding said first instruction;

(c) if said first instruction includes a dual-instruction mode bit that is asserted, then executing the steps of:

in a third clock period, fetching an instruction of the first type and an instruction of the second type in parallel, and in subsequent clock periods, decoding and executing said dual instructions in parallel in their respective processing units; and (d) if said first instruction does not include a dual instruction mode bit, or if said first instruction includes a dual instruction mode bit that is not asserted, then executing the steps of in a third clock period, fetching a single instruction not in parallel with another instruction, and in subsequent clock periods, decoding and executing said single instruction.

2. The method of claim 1, wherein in said step (c) said instruction of the first type is a floating point instruction and said instruction of the second type is a core instruction.

3. The method of claim 2, wherein in said step (c) said first instruction is a floating point instruction that includes said dual instruction mode bit.

* * * * *